United States Patent
Frank

(10) Patent No.: US 9,855,610 B2
(45) Date of Patent: Jan. 2, 2018

(54) VIBRATION-DAMPED TOOL

(71) Applicant: Sandvik Intellectual Property AB, Sandviken (SE)

(72) Inventor: Peter Frank, Floh-Seligenthal (DE)

(73) Assignee: Sandvik Intellectual Property AB, Sandviken (SE)

(*) Notice: Subject to any disclaimer, the term of this patent is extended or adjusted under 35 U.S.C. 154(b) by 119 days.

(21) Appl. No.: 14/422,720

(22) PCT Filed: Aug. 21, 2013

(86) PCT No.: PCT/EP2013/067354
§ 371 (c)(1),
(2) Date: Feb. 20, 2015

(87) PCT Pub. No.: WO2014/033020
PCT Pub. Date: Mar. 6, 2014

(65) Prior Publication Data
US 2015/0231706 A1    Aug. 20, 2015

(30) Foreign Application Priority Data
Aug. 31, 2012    (DE) .................. 10 2012 108 098

(51) Int. Cl.
*B23B 27/00*    (2006.01)
*B23B 29/02*    (2006.01)
(Continued)

(52) U.S. Cl.
CPC .......... *B23B 29/022* (2013.01); *B23B 27/002* (2013.01); *B23C 5/003* (2013.01);
(Continued)

(58) Field of Classification Search
CPC . B23B 2250/16; B23B 27/002; B23B 29/022; B23C 2250/16; B23C 5/003;
(Continued)

(56) References Cited

U.S. PATENT DOCUMENTS 3,031,046 A * 4/1962 Hoadley ................. B23P 15/04
188/268
3,230,833 A * 1/1966 Shurtliff ................ B23B 29/022
408/143
(Continued)

FOREIGN PATENT DOCUMENTS

CN    1390666    1/2003
CN    102275086    12/2011
(Continued)

OTHER PUBLICATIONS

International Search Report and Written Opinion dated Dec. 6, 2013 for International application No. PCT/EP2013/067354.
(Continued)

*Primary Examiner* — Daniel Howell
*Assistant Examiner* — Nicole N Ramos
(74) *Attorney, Agent, or Firm* — Morgan, Lewis & Bockius LLP

(57) ABSTRACT

A tool for machining work pieces is disclosed. In order to provide a tool which exhibits only very small vibrations during operation, the tool body of the tool has a cavity in which a multiplicity of hollow structural elements having an outer closed shell, within which at least one solid particle or a hollow body is arranged in a freely movable manner, are accommodated.

8 Claims, 5 Drawing Sheets

Figure 1:
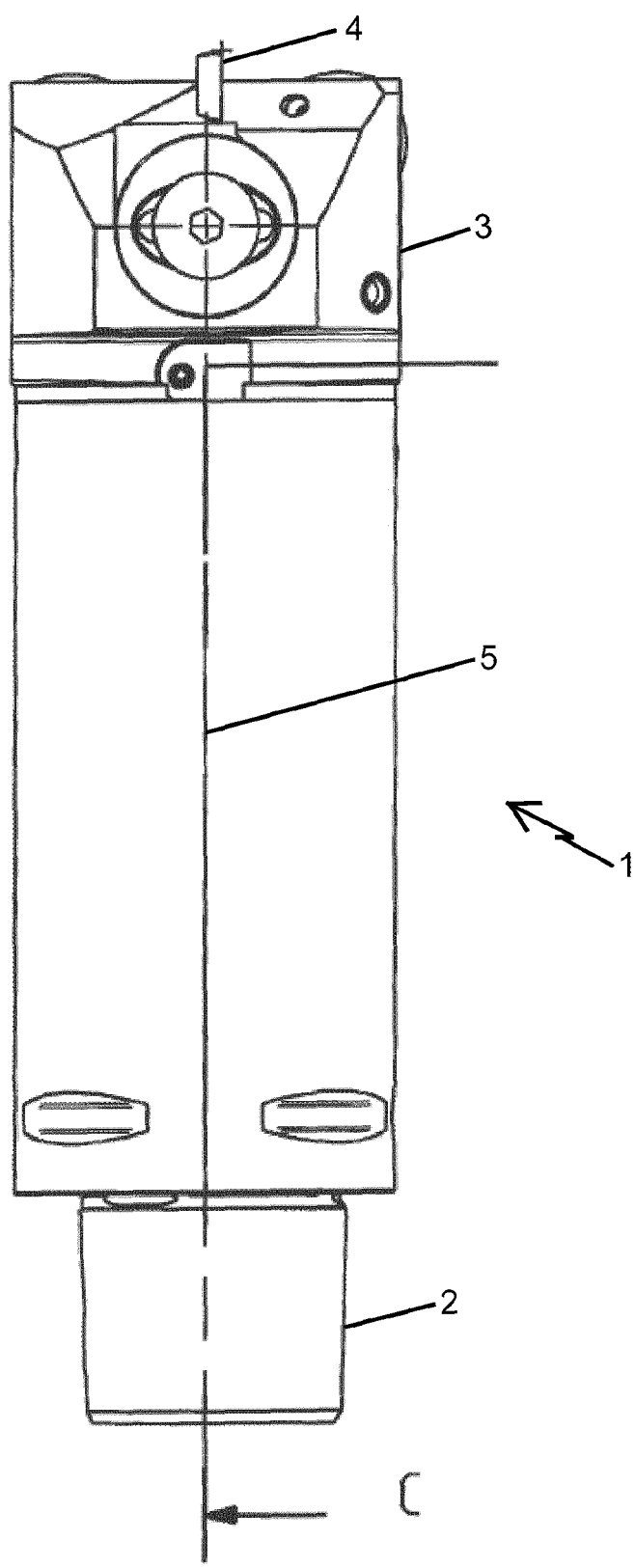

(51) Int. Cl.
*F16F 7/10* (2006.01)
*B23Q 11/00* (2006.01)
*B23C 5/00* (2006.01)

(52) U.S. Cl.
CPC ........ *B23Q 11/0035* (2013.01); *F16F 7/1028* (2013.01); *B23B 2250/16* (2013.01); *B23C 2250/16* (2013.01); *Y10T 407/1904* (2015.01); *Y10T 408/76* (2015.01)

(58) Field of Classification Search
CPC ............... B23Q 11/0035; F16F 7/1028; Y10T 407/1904; Y10T 408/76; Y10T 409/304312
USPC .................................. 188/378, 379; 267/137
See application file for complete search history.

(56) References Cited

U.S. PATENT DOCUMENTS

| | | | |
|---|---|---|---|
| 5,540,527 A * | 7/1996 | Bohnet | B23B 51/0027 408/147 |
| 6,935,472 B2 * | 8/2005 | Dussac | F16F 7/015 188/380 |
| 7,028,997 B2 | 4/2006 | Takahashi et al. | |
| 7,131,797 B2 | 11/2006 | Kai et al. | |
| 8,033,765 B2 | 10/2011 | Frank | |
| 9,016,988 B2 | 4/2015 | Sakamaki et al. | |
| 2003/0147712 A1 | 8/2003 | Kai et al. | |
| 2012/0024646 A1 | 2/2012 | Tsugihashi et al. | |
| 2012/0207560 A1 | 8/2012 | Sakamaki et al. | |

FOREIGN PATENT DOCUMENTS

| | | | |
|---|---|---|---|
| DE | 739398 A | | 9/1943 |
| DE | 1112350 A | | 8/1961 |
| DE | 1675652 C | | 8/1971 |
| DE | 102004003507 B4 | | 2/2006 |
| EP | 1557819 A1 | | 7/2005 |
| EP | 2014869 A1 | | 1/2009 |
| GB | 1032232 | | 6/1966 |
| JP | S52-27684 U | | 2/1977 |
| JP | 08047802 A | * | 2/1996 |
| JP | 2001-090776 A | | 4/2001 |
| JP | 2001096403 A | * | 4/2001 |
| JP | 2002-113603 A | | 4/2002 |
| JP | 2003-175436 A | | 6/2003 |
| JP | 2008-307642 | | 12/2008 |
| JP | 2011-115929 | | 6/2011 |
| JP | 2012-082880 A | | 4/2012 |
| RU | 1815014 A1 | * | 5/1993 |
| SU | 1134300 A1 | * | 1/1985 |
| WO | 2004/024389 A1 | | 3/2004 |
| WO | 2004/087354 A1 | | 10/2004 |
| WO | 2009/129091 A2 | | 10/2009 |

OTHER PUBLICATIONS

German Search Report in DE 10 2012 108 098.4 dated Apr. 11, 2013.
Notification of First Office Action (with English translation) for Chinese Application No. 201380045337.8 dated Nov. 27, 2015.
International Preliminary Report on Patentability dated Mar. 3, 2015, for International application No. PCT/EP2013/067354.
Notice of Reasons for Rejection dated May 22, 2017, issued in co-pending Japanese Patent Application No. 2015-528959.

* cited by examiner

C-C

VIBRATION-DAMPED TOOL

RELATED APPLICATIONS

The present application is a U.S. National Phase Application of International Application No. PCT/EP2013/067354, filed 21 Aug. 2013, which claims priority to German Application No. 10 2012 108 098.4, filed 31 Aug. 2012.

The present invention relates to a tool for machining workpieces, with a tool body.

Such tools have long been known. As a rule, the tool body has a drive part, which is provided for connection to a drive, and a machining part, which has at least one cutting element for machining a material. An example of such a tool is shown in WO 2004/087354. This drilling tool has a machining part which has a series of receivers for cutting plates that are provided for machining a workpiece. Furthermore, the drilling tool has, at its side facing away from the receivers for cutting inserts, a drive part in the form of a shaft with a correspondingly formed coupling element.

The tool bodies are usually produced from a metallic material, for example steel, and are accordingly solid. In principle, it is desirable to produce these tool bodies using as little material as possible, since this reduces the costs of producing the tool and brings down the energy consumption of the tool.

On the other hand, during machining these tools have not inconsiderable forces exerted on them which can result in vibrations in the tool body, which in turn reduces the cutting quality of the tool.

This frequently restricts the length of the tool bodies in the longitudinal direction, i.e. from the drive part to the machining part, since the longer the tool body the stronger the vibrations that can occur.

Individual attempts have already been made to integrate into a tool a passive vibration damper that can perform a damped movement within the tool. However, such passive vibration dampers extend a considerable length and, as a rule, increase the weight of the tool. However, a greater weight of the tool in turn results in increased vibration, because of the decrease in the natural frequencies of the tool.

When these tools are produced, therefore, often more material is used than is required to absorb the forces during machining. This additional mass serves solely to enable vibrations to be damped better.

Starting from the described state of the art, the object of the present invention is therefore to provide a tool which in operation displays only very low vibrations and/or the length of which in the longitudinal direction can be greater than that of conventional tools.

According to the invention, this object is achieved in that the tool body has a cavity in which there are received a plurality of hollow structural elements with a closed outer shell, within which at least one solid particle or a hollow body is arranged freely movable. Such structural elements are known for example from DE 10 2004 003 507 B4, the contents of which regarding the structure of the hollow structural elements are incorporated by reference. All the hollow structural elements described therein are in principle suitable for arrangement in the cavity of the tool body.

These hollow structural elements are generally used for sound absorption and are used as an intermediate filler layer of for example ceilings in order to reduce the sound of footfall.

However, it has been shown that the particles or hollow bodies that are received within the hollow structural elements have very good vibration-damping properties. In particular in the case of shocks occurring abruptly, the freely movable particles or hollow bodies initially remain in position because of their inertia, and thereby provide shock damping. Should the tool body vibrate, vibration is also excited in the freely movable particles or hollow bodies. Since the natural frequencies of vibration in the freely movable particles or hollow bodies differ significantly from the natural frequency of the tool, however, this results in effective damping of the vibration.

According to the invention, a cavity is now introduced into the tool body, which results in a saving on material and thus a reduction in weight. Simply by reducing the weight, the natural frequencies of the tool are increased and therefore the susceptibility to vibration is reduced.

A plurality of the said hollow structural elements are then arranged in this cavity. The cavity is then closed, or the structural elements are secured in the cavity. Namely, the structural elements are not only capable of absorbing sound but also result in an appreciable reduction in vibrations. As a result of the measure according to the invention, it is therefore possible in the known tools both to save on material and to reduce tool vibration by introducing a cavity and filling the cavity with the said hollow structural elements. The hollow structural elements themselves are very lightweight.

In a preferred embodiment, the tool is a drilling or milling tool with an axis of rotation, and has a shaft portion, for connecting the tool to a drive, and a tool portion, which has a cutting edge for machining a workpiece or to which a cutting insert with such a cutting edge can be secured.

In a further preferred embodiment, the cavity is designed with a 2-fold or multiple rotational symmetry in a section plane perpendicular to the axis of rotation. As an alternative, it is also possible for several cavities to be provided, in each of which there are received a plurality of hollow structural elements with a closed outer shell, within which at least one solid particle or a hollow body is arranged freely movable, which cavities are arranged such that they are designed with a 2-fold or multiple rotational symmetry in a section plane perpendicular to the axis of rotation.

By a 2-fold rotational symmetry is meant that a 180° rotation about the axis of rotation transforms the cavity into itself. In the case of an n-fold rotational symmetry, in a rotation by 360°/n about the axis of rotation the cavity again transforms into itself.

This arrangement has the advantage that the presence of the cavity does not cause the tool to experience any additional imbalance which would then in turn have to be compensated for by corresponding measures.

In a preferred embodiment, the cavity is formed substantially annular. The plane of the annulus is preferably arranged perpendicular to the axis of rotation of the tool, wherein the axis of rotation runs through the centre point of the annulus.

In an alternative embodiment, the tool is a non-rotating tool, for example a tool for lathing or cut-off.

In a further preferred embodiment, the tool is constructed in two parts, wherein the two tool parts delimit the cavity. When the tool is produced or assembled, therefore, the cavity, which is formed as an open bore or a depression in one tool part, is first filled with the hollow structural elements. In a further step, the second tool part is connected to the first tool part, wherein the two tool parts are formed such that the second tool part closes the open bore or the open recess, with the result that a closed cavity forms, in which the plurality of hollow structural elements are arranged.

In a preferred embodiment, the two tool parts can be connected to one another via a screw, wherein in the case of a rotating tool the screw preferably lies on the axis of rotation and the screw outer face delimits the cavity, at least in sections. In other words, the cavity runs around the screw outer face and can preferably be formed annular or hollow-cylindrical.

The hollow structural elements should substantially completely fill the cavity in order to prevent a movement of the structural elements in the cavity, and the associated imbalance of the tool, during operation of the tool.

As an alternative or in combination therewith, the hollow structural elements can be connected to one another within the cavity by sintering, by adhesion or by a curing substance such as for example casting resin. As a result of this measure, it is now not strictly necessary for the cavity to be completely filled with the hollow structural elements, since during operation the hollow structural elements can no longer move individually. Moreover, connecting the structural elements, in particular if the structural elements are connected to the cavity walls, has the additional advantage that the structural elements can absorb forces, whereby the mechanical demands made of the tool body, or the forces that the latter must absorb, are reduced even further, with the result that it is possible to save on even more material.

In a further preferred embodiment, it is provided that the cavity is arranged close to the axis, i.e. within a region that extends radially outwards from the axis of rotation by the length a, wherein the length a<0.8*r, preferably <0.65*r, and ideally <0.5*r, wherein r is half the tool diameter.

In a further preferred embodiment, the cavity is arranged closer to the end of the tool on the tool portion side than to the end on the shaft portion side.

In a further preferred embodiment, it is provided that the cavity is formed stepped or conical along the axis of rotation, from the drive portion in the direction of the tool portion, with the result that the cross-sectional surface area perpendicular to the axis of rotation of the cavity is smaller at a first axial position than at a second axial position, wherein the first axial position is arranged closer to the shaft portion than the second position.

As an alternative, it would also be possible to arrange the hollow structural bodies in a separate vessel and to introduce this vessel into the cavity.

Figure 2:
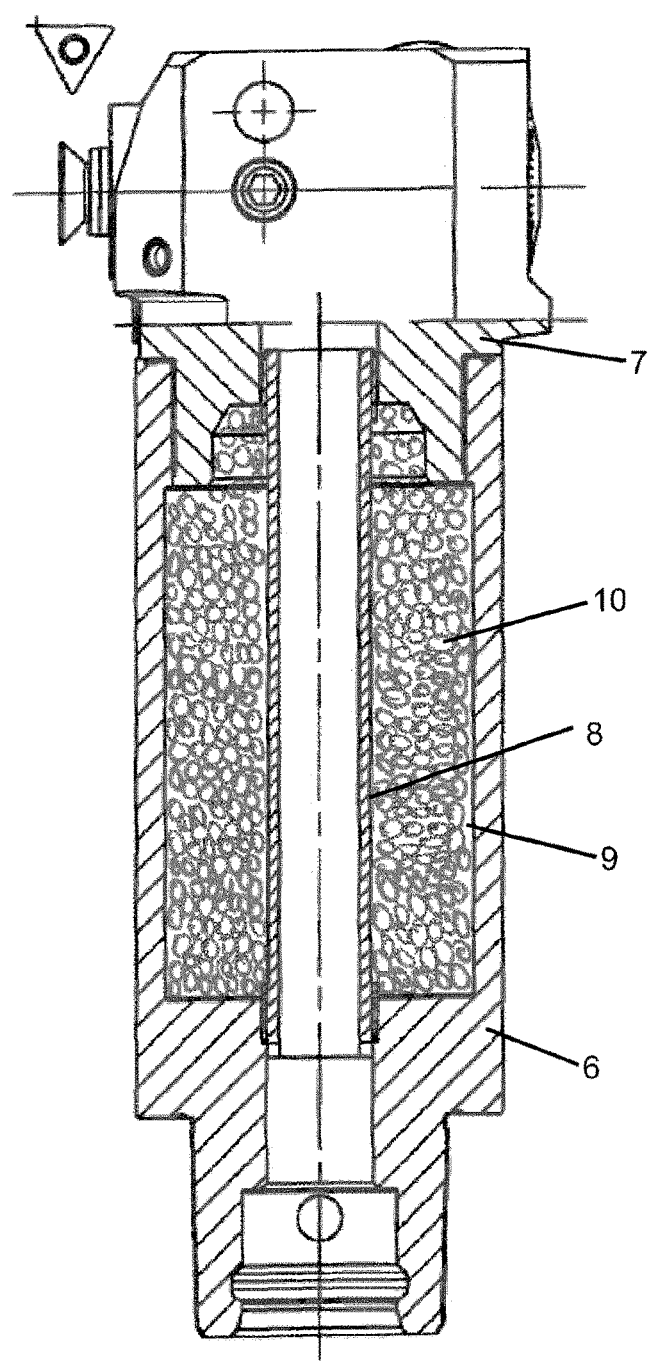
Figure 3:
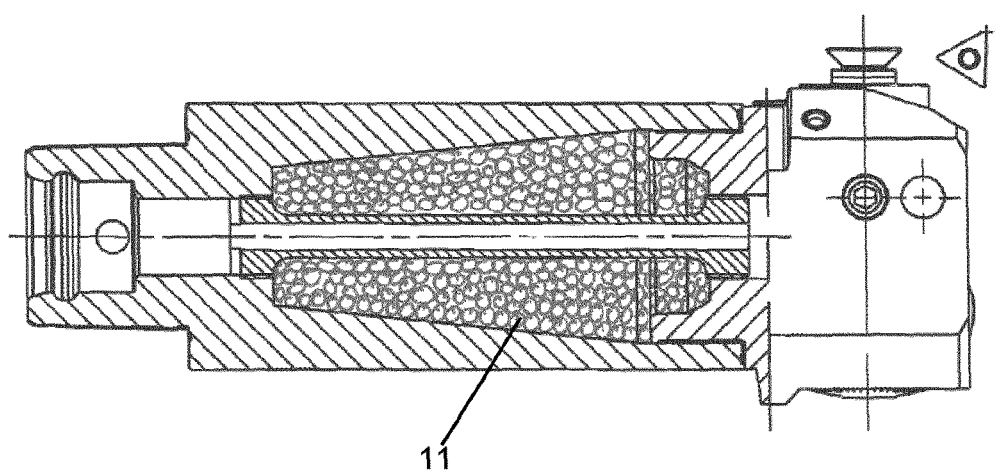

Further advantages, features and possible uses of the present invention will become clear from the following description of a preferred embodiment and from the associated figures. There are shown in:

FIG. 1 a side view of a first embodiment of a tool according to the invention,

FIG. 2 a sectional view along the line C-C in FIG. 1,

FIG. 3 a sectional view of a second embodiment of the invention, and

Figure 4:
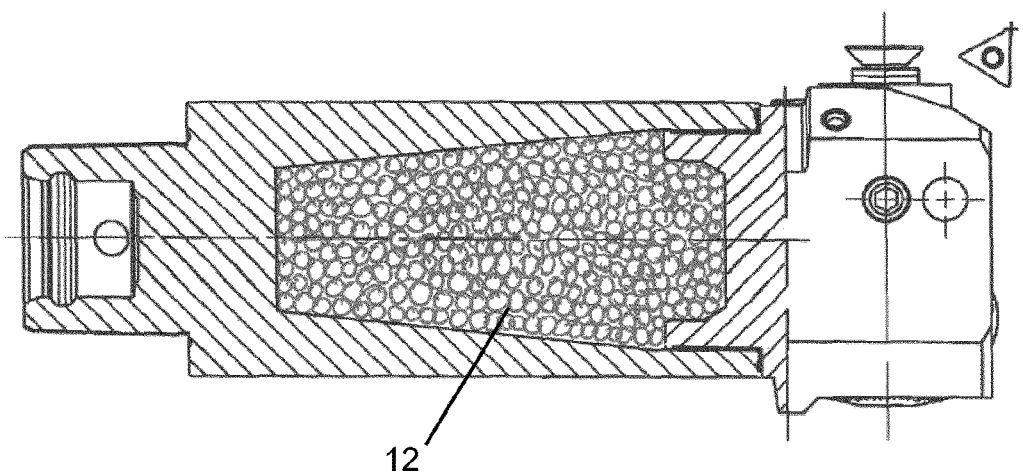

FIG. 4 a sectional view of a third embodiment of the invention.

Figure 5:
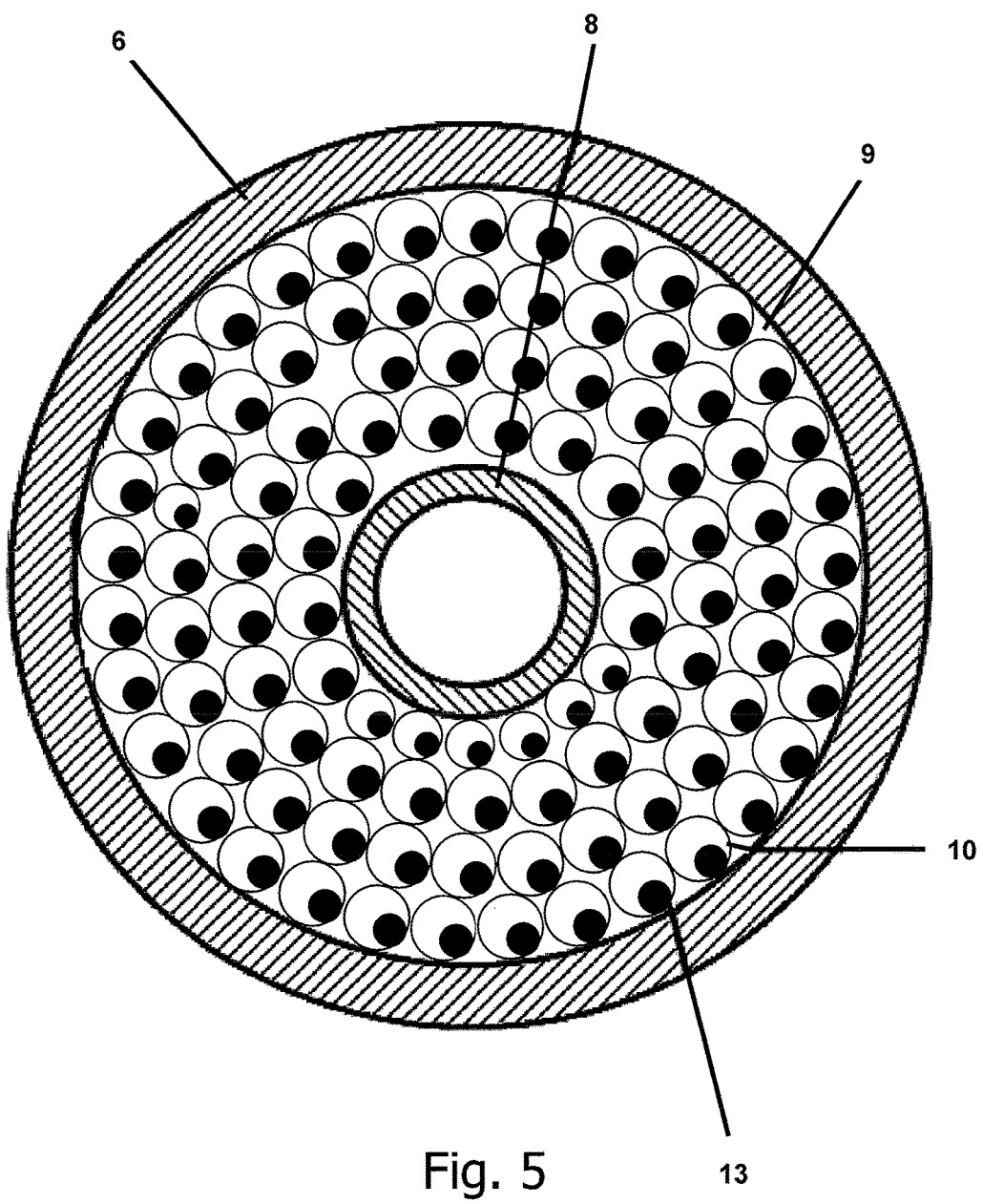

FIG. 5 is a radial cross-section of FIG. 1 perpendicular to axis C-C.

The tool 1 according to the invention has a shaft portion 2 which can be attached to a drive. Moreover, the tool 1 has a tool portion 3 on which a cutting plate 4 with a cutting edge is arranged. The tool represents a drilling head which rotates about the axis of rotation 5 during machining.

As can be seen in particular from the sectional view of FIG. 2, the tool 1 consists of two parts, namely a lower part 6 and an upper part 7. The lower part 6 and the upper part 7 are connected to one another via a hollow screw 8 which engages in both the lower part 6 and the upper part 7. A depression or cavity 9 which is arranged to surround the hollow screw 8 is provided in the lower part 6. This cavity 9 in the lower part 6 is closed by the upper part 7, with the result that when the upper part is placed thereon an enclosed void results. As indicated schematically in the drawing, arranged in this cavity 9 are a plurality of hollow structural elements 10 which are introduced either as a loose bulk product, wherein in this case the cavity 9 should be filled as completely as possible, or embedded in an adhesive or resin structure. If the hollow structural elements 10 are connected to one another and ideally also to the hollow screw 8 and the lower part 6, for example by adhesion, the hollow structural elements do not only perform a vibration-absorbing function but at the same time can also absorb forces, with the result that the outer walls of the lower part 6 can be formed with a smaller wall thickness, which represents a further saving on material. Where necessary, coolant and/or lubricant can be supplied via the hollow screw 8.

FIG. 3 shows a corresponding sectional view of a second embodiment of the invention. The structure is very similar to the first embodiment. However, in this case the cavity is formed conical, i.e. it widens in the direction of the tool portion. As a result, a high level of rigidity can be achieved in the vicinity of the shaft portion and a high level of vibration damping can be achieved in the vicinity of the tool portion. It can furthermore be seen that in the region of the cavity the hollow screw has a smaller external diameter, with the result that the cavity extends further in the direction of the axis of rotation.

FIG. 4 shows a corresponding sectional view of a third embodiment of the invention. This embodiment differs from the second embodiment in that the two tool parts are not connected to one another by the hollow screw, with the result that in this case the cavity 12 is also not formed annular.

As a result of the measure according to the invention, the tools for machining can be designed significantly longer in the direction of the axis of rotation with unchanged diameter, without this resulting in greater vibration with unchanged cutting forces. Moreover, the weight of the tool can be significantly reduced.

LIST OF REFERENCE NUMBERS

1 Tool
2 Shaft portion
3 Tool portion
4 Cutting plate
5 Axis of rotation
6 Lower part
7 Upper part
8 Hollow screw
9 Cavity
10 Structural elements
11 Cavity
12 Cavity

The invention claimed is:

1. A tool for machining workpieces, comprising a tool body,
wherein the tool body has at least one cavity in which there are received a plurality of hollow structural elements with a closed outer shell, within the plurality of hollow structural elements at least one solid particle or a hollow body is arranged freely movable,
wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the cavity has a 2-fold or multiple rotational symmetry in a section plane perpendicular to the axis of rotation, or in that several cavities, in which there are received a plurality of hollow structural elements with a closed outer shell, within which at least one solid particle or a hollow body is arranged freely movable, have a 2-fold or multiple rotational symmetry in a section plane perpendicular to the axis of rotation.

2. A tool for machining workpieces, comprising a tool body, wherein the tool body has at least one cavity in which there are received a plurality of hollow structural elements with a closed outer shell, within the plurality of hollow structural elements at least one solid particle or a hollow body is arranged freely movable, wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the hollow structural elements substantially completely fill the cavity.

3. A tool for machining workpieces, comprising a tool body, wherein the tool body has at least one cavity in which there are received a plurality of hollow structural elements with a closed outer shell, within the plurality of hollow structural elements at least one solid particle or a hollow body is arranged freely movable, wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the hollow structural elements are connected to one another within the cavity by sintering, by adhesion or by a curing substance.

4. A tool for machining workpieces, comprising a tool body, wherein the tool body has at least one cavity in which there are received a plurality of hollow structural elements with a closed outer shell, within the plurality of hollow structural elements at least one solid particle or a hollow body is arranged freely movable, wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the cavity is arranged within a region that extends radially outwards from the axis of rotation by a length a, wherein the length $a<0.8*r$, and wherein r is half the tool diameter.

5. A tool for machining workpieces, comprising a tool body, wherein the tool body has at least one cavity in which there are received a plurality of hollow structural elements with a closed outer shell, within the plurality of hollow structural elements at least one solid particle or a hollow body is arranged freely movable, wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the cavity is formed stepped or conical along the axis of rotation, from the shaft portion in the direction of the tool portion, with the result that the cross-sectional surface area perpendicular to the axis of rotation of the cavity is smaller at a first axial position than at a second axial position, and wherein the first axial position is arranged closer to the shaft portion than the second position.

6. The tool according to claim 4, wherein the length $a<0.65*r$.

7. The tool according to claim 4, wherein the length $a<0.5*r$.

8. A tool for machining workpieces, comprising a tool body, wherein the tool body has at least one cavity in which there are received a plurality of hollow structural elements with a closed outer shell, within the plurality of hollow structural elements at least one solid particle or a hollow body is arranged freely movable, wherein the tool is a drilling or milling tool with an axis of rotation, wherein the tool includes a shaft portion, for connecting the tool to a drive, and a tool portion, which has a cutting edge for machining a workpiece or to which a cutting insert with such a cutting edge is securable, wherein the cavity is formed substantially annular, and wherein the cavity has a shape that is stepped or conical along the axis of rotation, wherein the cavity has a cross-sectional surface area perpendicular to the axis of rotation that is smaller at a first axial position than at a second axial position, and wherein the first axial position is arranged closer to the shaft portion than the second position.

* * * * *